United States Patent
Cook et al.

(10) Patent No.: US 12,182,530 B1
(45) Date of Patent: *Dec. 31, 2024

(54) TECHNIQUES FOR TRANSLATING MESSAGES INTO MULTIPLE LANGUAGES AMONG A GROUP OF PORTABLE ELECTRONIC DEVICES

(71) Applicant: Relay, Inc., Raleigh, NC (US)

(72) Inventors: Adam Cook, Apex, NC (US); Jared Kashimba, Micanopy, FL (US); Hunter Davis, Chapel Hill, NC (US)

(73) Assignee: Relay, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,544

(22) Filed: May 8, 2024

Related U.S. Application Data

(63) Continuation of application No. 18/658,364, filed on May 8, 2024.

(60) Provisional application No. 63/634,615, filed on Apr. 16, 2024.

(51) Int. Cl.
G06Q 40/12 (2023.01)
G06F 40/58 (2020.01)
H04W 4/12 (2009.01)

(52) U.S. Cl.
CPC .............. *G06F 40/58* (2020.01); *H04W 4/12* (2013.01)

(58) Field of Classification Search
None
See application file for complete search history.

(56) References Cited

U.S. PATENT DOCUMENTS

| | | | |
|---|---|---|---|
| 2010/0121629 A1* | 5/2010 | Cohen | G06Q 40/12 704/235 |
| 2010/0185434 A1* | 7/2010 | Burvall | G10L 15/005 704/3 |
| 2021/0210076 A1* | 7/2021 | Kuczmarski | G06F 16/3329 |
| 2022/0189457 A1* | 6/2022 | Shen | G10L 15/005 |

(Continued)

*Primary Examiner* — Seong-Ah A Shin
(74) *Attorney, Agent, or Firm* — Gregory Stephens

(57) ABSTRACT

Techniques are disclosed for translating messages into multiple languages among a group of wireless portable electronic communication devices communicable with one another via a remote cloud-based communications platform server (CPS). The CPS receives a first message from a sending portable communication device (PCD), the first message being one of a voice message or a text message. The CPS then determines a language setting for the sending PCD. When the first message is a voice message, the CPS converts it to a first text message in the language of the sending PCD. The CPS also determines a logical channel associated with the first message and any other PCDs associated with the logical channel as well as the language settings for the other PCDs. For each other PCD associated with the logical channel, the CPS translates the first text message to a second text message in the languages of the other PCDs. The CPS also determines, from a user profile, a current format setting for received messages. When the current format setting for received messages is voice, the CPS converts the second text message to a second voice message in the language of the other PCD and sends the second voice message to the other PCD. When the current format setting for received messages is text, the CPS sends the translated second text message to the other PCD.

18 Claims, 3 Drawing Sheets

(56) References Cited

U.S. PATENT DOCUMENTS

| | | | |
|---|---|---|---|
| 2022/0201456 A1* | 6/2022 | Chiang | H04L 12/1813 |
| 2023/0127306 A1* | 4/2023 | Emelyanenko | G06F 9/4881 |
| | | | 718/101 |

* cited by examiner

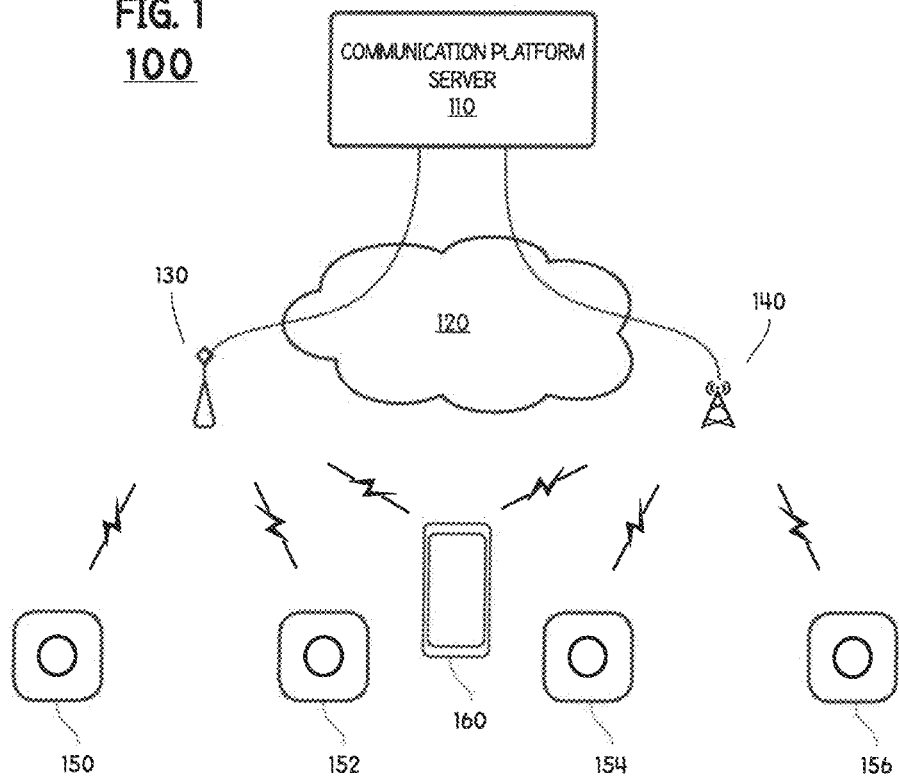
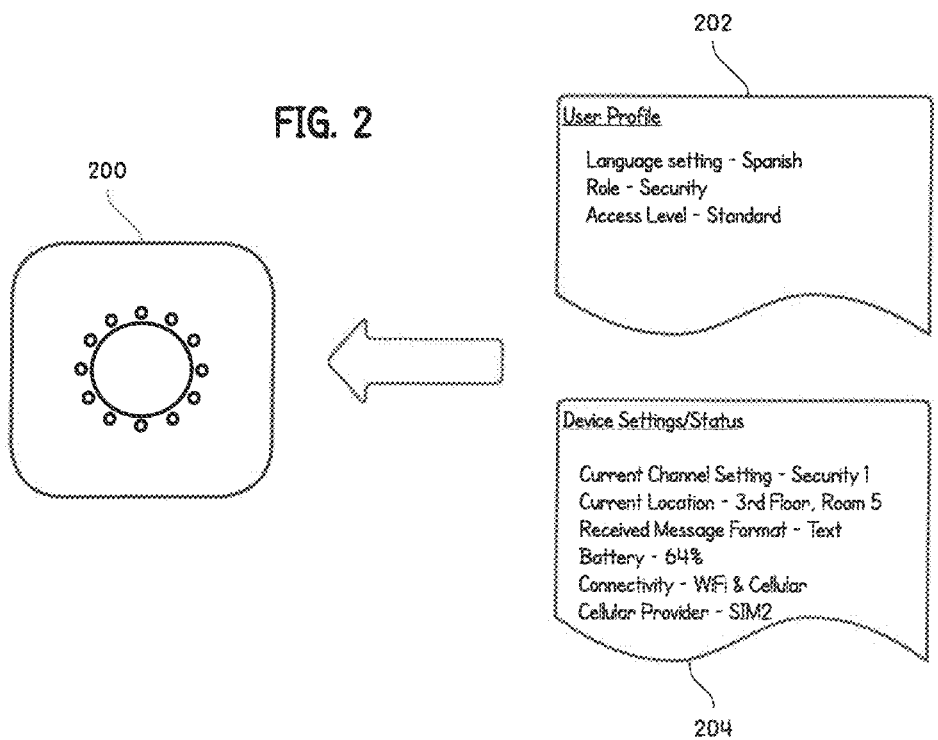

300

400

TECHNIQUES FOR TRANSLATING MESSAGES INTO MULTIPLE LANGUAGES AMONG A GROUP OF PORTABLE ELECTRONIC DEVICES

CROSS-REFERENCE TO RELATED APPLICATIONS

This application claims priority to and the benefit of U.S. patent application Ser. No. 18/658,364 filed on May 8, 2024 entitled, "Techniques for Translating Messages Into Multiple Languages Among a Group of Portable Electronic Devices" which claims priority to and the benefit of U.S. Provisional Patent Application 63/634,615 filed on Apr. 16, 2024 entitled, "Techniques for Translating Messages Into Multiple Languages Among a Group of Portable Electronic Devices."

TECHNICAL FIELD

Examples described herein are generally related to techniques for translating voice and/or text messages among two or more languages exchanged among two or more associated portable electronics devices.

BACKGROUND

Group communications over portable electronic devices like walkie-talkies or other purpose built wireless communication devices are valuable to enterprises. For instance, many security teams utilize communication devices to communicate with one another. Similarly, other teams of workers may have a need for group communications. Often, a team of workers grouped together may not all speak the same language, making group communications difficult when multiple languages may be needed for efficient communication.

What is needed is a technique for determining the preferred language for each user/device that is party to a group communication channel and converting, when necessary, an incoming voice or text message to the preferred language for that user/device.

SUMMARY

Various embodiments of the present disclosure relate to techniques for translating audio messages from one language into various other specified languages for portable communication devices that comprise a group of users having different language preferences.

In one embodiment, a method of translating messages into multiple languages among a group of wireless portable electronic communication devices is disclosed. In a communications platform server (CPS), a first voice message may be received from a sending portable communication device (PCD). The CPS may then determine a language setting for the sending PCD before converting the first voice message to a first text message in the language in which the sending PCD is set. The CPS may also determine a logical channel associated with the first voice message as well as determine other PCDs associated with the logical channel. For each other PCD associated with the logical channel, the CPS may then determine a language setting for the other PCD. The CPS may then translate the first text message to a second text message in the language to which the other PCD is set. This may be followed by converting the second text message to a second voice message in the language to which the other PCD is set. The CPS may then send the second voice message to the other PCD.

In some embodiments, each PCD may be associated with a configurable user profile that includes the language setting indicative of the language preference of the user.

In some embodiments, the CPS maintains a record of the user profile associated with each PCD and a record of the logical channels each PCD is associated with.

In some embodiments, the first voice message may include metadata identifying the logical channel to which the first voice message is associated and speech data comprising the first voice message content.

In some embodiments, the first voice message may be transmitted from the sending portable communication device (PCD) over a WiFi connection to a network connected to the CPS.

In some embodiments, the first voice message may be transmitted from the sending portable communication device (PCD) over a cellular connection to a network connected to the CPS.

In some embodiments, prior to sending the second voice messages to the other PCDs associated with the channel, the CPS may send the first voice message to the other PCDs associated with the channel such that the other PCDs receive the first voice message in the sending PCD language setting followed by the second voice message in the translated receiving PCD language setting.

In some embodiments, the second text message may be sent to the other PCDs associated with the channel.

In another embodiment, a second method of translating messages into multiple languages among a group of wireless portable electronic communication devices is disclosed. In a communications platform server (CPS), a first message may be received from a sending portable communication device (PCD). The first message may be one of a voice message or a text message. The CPS may then determine a language setting for the sending PCD. When the first message is a voice message, the CPS may convert the voice message to a first text message in the language in which the sending PCD is set. The CPS may then determine a logical channel associated with the first message and any other PCDs associated with the logical channel. The CPS may also determine the language settings for the other PCDs associated with the logical channel.

For each other PCD associated with the logical channel, the CPS may translate the first text message to a second text message in the language to which the other PCD is set. The CPS may then determine, from a user profile, a current format setting for received messages. The format for receiving a message into a PCD may be voice or text. When the current format setting for received messages is voice, the CPS may convert the second text message to a second voice message in the language to which the other PCD is set before sending the second voice message to the other PCD. When the current format setting for received messages is text, the CPS may send the second text message to the other PCD.

The aforementioned methods may also be implemented as computer systems that are configured to execute the methods. Additionally, the methods may be implemented by non-transitory computer-readable mediums comprising program instructions executable by a processor that cause the processor to execute the methods.

Any illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the one or more certain examples.

FIG. 1 illustrates a network environment for a wireless communication system according to the embodiments of the invention.

FIG. 2 illustrates some of the data residing on a personal communication device (PCD) according to the embodiments of the invention.

DETAILED DESCRIPTION

Figure 3:
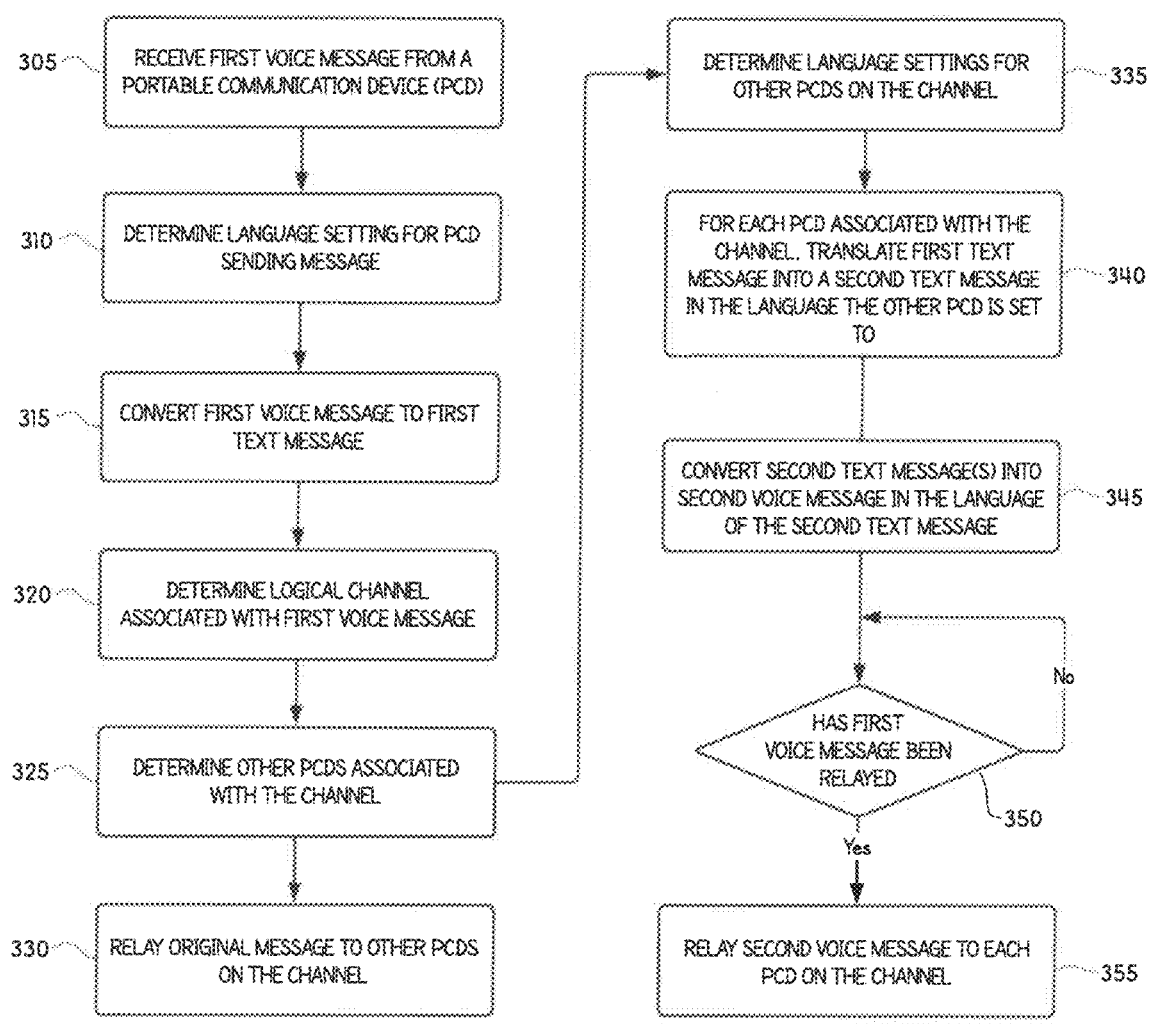
FIG. 3 is a logic flow diagram describing a language translation process carried out by a communication platform server.

Although the above operations are described sequentially, many of the operations can be performed in parallel or concurrently. In addition, the order of the operations may be rearranged. A process may have additional steps not included in FIG. 2. Furthermore, examples of the methods may be implemented by hardware, software, firmware, middleware, microcode, hardware description languages, or any combination thereof. When implemented in software, firmware, middleware, or microcode, the program code or code message segments to perform the necessary tasks may be stored in a non-transitory computer-readable medium such as a storage medium. Processors may perform the described tasks.

The embodiments described herein utilize a communication system comprising a plurality of portable communication devices (PCDs) that are managed by a cloud based communication platform server (CPS). Each individual portable communication device establishes a connection with the CPS. The CPS may then manage communication among the PCDs. It should be noted that a PCD may comprise a purpose built device like those made by Relay, Inc., a smartphone executing an application that is configured to communicate with the CPS, or a laptop or other computer executing an application that is configured to communicate with the CPS.

In operation, the various PCDs may coordinate with the CPS to create logical communication channels. A logical communication channel may be characterized as a specific grouping of PCDs. Each PCD may be a member of multiple logical channels. The CPS maintains a list of logical channels and the PCDs that are members of the logical channel. A PCD may then switch itself to a logical channel for purposes of communicating with other PCDs on that logical channel. The CPS, in some situations, can manipulate the logical channels on a given PCD causing it to switch to another logical channel if necessary.

Each PCD is enabled with a user profile. The user profile is associated with a person and is unique to that person. Any given PCD may be configured with a user profile and user profiles may be deleted or added to PCDs via an administration function. A PCD may only be configured with a single user profile at any given time.

There are a variety of settings that may be associated with a user profile. These settings may then influence or control what the PCD can access on the network. For instance, a user profile may contain the role or job function (e.g., security, housekeeping, front desk, etc.) of the user which in turn may affect which logical channels that PCD may be a party to. Similarly, the job function may define a geo-fenced boundary of where that PCD may be permitted.

Of more relevance to the present disclosure, the user profile may include language settings. For example, the user may specify one or more languages in which the user may be fluent or conversant. If there is more than one language associated with the profile, one may be deemed the default language. Moreover, the user may specify one language for outbound communications and another language for inbound communications.

Consider a logical channel comprised of four (4) users. The logical channel may have been created and given a label such as, for instance, HQ Security. Each user is associated with a PCD and each PCD is provisioned with that user's user profile. In this example, we will refer to the users as Bob, Maria, Pierre, and Alice. Bob speaks only English, Maria speaks Spanish, Pierre speaks both French and English, and Alice speaks Chinese. While Pierre speaks both French and English, he prefers to speak in French but listen in English.

Any user may initiate a conversation on the HQ Security channel by speaking a message into the PCD while it is set to the HQ Security channel and is in transmit mode. It is assumed that all the PCDs are also set to the HQ Security channel for purposes of this illustration. In general, a user will speak a message in their default language which is relayed up to the CPS. The CPS will determine the language settings for the PCD that sent the audio message. This may be done either by looking up the language setting in the user profile associated with the PCD. Alternatively, the CPS can determine the spoken language using a language detection software and processes. The CPS will then convert the received audio message from speech to text in the spoken language.

The CPS then determines the other PCDs that comprise the HQ Security channel and the language settings (specifically the inbound communication language setting) in the user profile(s) for the other PCDs in the HQ Security channel. The CPS then translates (if necessary) the text of the converted original audio message into text in the language specified by the other PCDs in the HQ Security channel. This text is then converted to speech in the target language for each PCD.

In one embodiment, the CPS will re-broadcast the original audio message in the original language to all PCDs in the HQ Security channel. Simultaneously, the CPS will perform the translation process and relay the translated audio to each PCD in their specified language. If the receiving PCD has the same language settings as the sending PCD, no translation services are required for that receiving PCD.

In another embodiment, the CPS will not re-broadcast the original audio message in the original language to any PCDs having different language settings than the sending PCD. Rather, the CPS will perform the translation process and relay only the translated audio to each PCD in their specified language. If the receiving PCD has the same language settings as the sending PCD, no translation services are required for that receiving PCD.

When Bob is in transmit mode on the HQ Security channel and says "Is anyone on the 5$^{th}$ floor?", the audio message is relayed to the CPS. The CPS determines that the audio message is in English and also determines the language settings for the other three PCDs that comprise the HQ Security channel. In this example, the CPS translates the English audio message into English text. It then translates the English text to Spanish text and then converts the Spanish text to Spanish audio for Maria's PCD and translates the English text to Chinese text and then converts the Chinese text to Chinese audio for Alice's PCD. No translation is needed for Pierre's PCD as it has specified English as the preferred language for inbound communication.

Meanwhile the CPS may have processed the original audio message from Bob by broadcasting it in its original form to the other PCDs in the HQ Security channel. Thereafter, the CPS sends the translated Spanish audio to Maria's PCD and the translated Chinese audio to Alice's PCD.

FIG. 1 illustrates a network environment for a wireless communication system according to the embodiments of the invention. A communications platform server (CPS) 110 is a cloud based remote server whose function is to manage communications among multiple portable communication devices (PCDs) 150, 152, 154, 156. While four (4) PCDs have been illustrated, the CPS may manage any number of PCDs.

The CPS 110 sits in a packet based computer network 120 such as, for instance, the Internet. The CPS may be configured to communicate directly with each PCD 150, 152, 154, 156 in the network. In this environment, the PCDs may be purpose built communication devices capable of multiple modes of wireless communication. A PCD may also be a smartphone device 160 that is also capable of multiple modes of wireless communication. The PCDs 150, 152, 154, 156 typically have two modes of connectivity that provide a connection with the CPS 110. A first may be WiFi (e.g., 802.11 type protocols and interfaces) that utilize a WiFi access point 130. A second may be cellular (e.g., cellular based RF wireless protocols and interfaces) that utilize a cellular basestation 140. The WiFi access point 130 and the cellular basestation 140 each have backhaul connectivity to the packet based computer network 120 for direct communication with CPS 110.

Anytime a PCD 150, 152, 154, 156 is within range of a WiFi access point 130 or a cellular basestation 140, it establishes a connection with the CPS and the CPS considers the PCD on-line.

FIG. 2 illustrates some of the data residing on a personal communication device (PCD) according to the embodiments of the invention. As mentioned above, a PCD 200 may store or have access to certain data necessary to enable the invention. For instance, PCD 200 may be loaded with a user profile 202 that may be comprised of, among other things, a language setting. The language setting is indicative of the language preference of a particular user when using PCD 200.

PCD 200 may also store or have access to various device settings 204 or other status information. Some of the data stored may include a current logical channel setting and the current preferred received message format. The received message format may be changed by the user to reflect current preferences. For instance, when the user is in a location that is not suitable for spontaneous noisy message bursts, the current received message preference may be set to text. For participating in verbal conversations, the current received message preference may be set to voice.

FIG. 3 is a logic flow diagram 300 describing a language translation process carried out by the communication platform server (CPS) 110. FIG. 3 may be described in the context of a four person user group (Bob, Maria, Pierre, and Alice) in which each user has their own user profile configured and executing on a PCD. The user profile may include language settings for outbound and inbound messages. In addition, it may be assumed that each PCD is on-line with the CPS and set to the same logical channel on which they are all members. Thus, when one member transmits a message on the channel, the other members will receive it. If the PCD for a member of the channel was not on-line or was not tuned to the proper channel, any inbound messages may not be received by that member's PCD or may be queued in a missed messages queue for later retrieval. Messages are generally in audio form similar to the way one would communicate using a walkie-talkie. For instance, a user engages transmit mode by depressing a button on a PCD and speaks into a microphone. Upon completion of the speech, the user releases the button to return to receive mode.

In step 305, the CPS 110 may receive an audio message from a PCD 150. For instance, Bob may engage transmit mode on his PCD 150 and speak the words, "Does anyone know where Jim is?" This audio message is transmitted wirelessly from Bob's PCD 150 via a Wifi 130 or cellular 140 connection through network 120 where it is received by CPS 110.

CPS 110 first determines the language of the received audio message in step 310. For instance, CPS 110 is aware of which PCD 150 sent the audio message. CPS 110 also knows which user profile 202 is currently associated with the PCD 150 that sent the audio message. In this example, Bob sent the audio message. The CPS 110 determines from Bob's user profile 202 that his language setting is set to English for both inbound and outbound communication. Alternatively, the CPS 110 may independently determine the language of the received message from Bob's PCD 150 by analyzing the audio itself.

Once the sending language has been determined, CPS 110 converts the audio into text in the same language in step 315. Here, the English audio is converted into English text. CPS 110 also knows which logical channel Bob's PCD 150 is currently set to in step 320 and uses that knowledge to look up other PCDs 152, 154, 156 that are included on that particular logical channel in step 325. Each logical channel may be given a label or name when it is created. This name is known to and stored by CPS 110, along with all other user profiles 202 that are members of that channel. For illustrative purposes, the logical channel in use may be named HQ Security channel. In this case, CPS 110 determines that Maria's PCD 152, Pierre's PCD 154, and Alice's PCD 156 are all included on the HQ Security channel.

CPS 110 may then fork into two paths. In the first path, CPS 110 will broadcast, in step 330, the original English audio message from Bob's PCD 150 to the other three PCDs 152, 154, 156 associated with Maria, Pierre, and Alice where it will be played back in English.

In the second path, CPS 110 will determine the language settings for each of the receiving PCDs 152, 154, 156 based on the user profile 202 for the PCDs 152, 154, 156 in step 335. CPS 110 determines that Maria's user profile 202 is set to Spanish for inbound communications, Pierre's user profile 202 is set to English for inbound communications, and Alice's user profile 202 is set to Chinese for inbound communications. CPS 110 may then translate the English text into Spanish text for Maria's PCD 152 and Chinese text for Alice's PCD 156 in step 340. No translation is needed for Pierre's PCD 154 because it is set to English which is the same language as the originally sent message. CPS 110 may then convert the Spanish translated text into Spanish speech for Maria's PCD 152 and the Chinese translated text into Chinese speech for Alice's PCD 156 in step 345.

At this point, CPS 110 may determine if it has broadcast, in step 330, the original English audio message from Bob's PCD 150 to the other three PCDs 152, 154, 156 in decision block 350. If not, CPS 110 will wait until step 330 occurs prior to relaying translated audio to any PCD 152, 154, 156 needing a translation in step 355. In this case, once the original audio has been broadcast in its original language, CPS 110 will send Maria's PCD 152 the translated Spanish audio and send Alice's PCD 156 the translated Chinese audio.

In this scenario, Maria will receive the original English audio followed immediately thereafter with a Spanish translation. Similarly, Alice will receive the original English audio followed immediately thereafter with a Chinese translation. Pierre may only receive the original English audio as his language setting specifies English and no translation is deemed necessary.

As stated earlier, the process may be implemented without first playing the original audio in the original language. For instance, Maria and Alice may only receive the translated audio in their respective languages without hearing the original message.

It should also be noted that since this is a speech-to-text followed by a text translation and finally a text-to-speech system, combinations of text and audio may be supported. For example, if the sending PCD 150 is text enabled, the original message may be sent as text which would negate the need for the first speech to text step. Similarly, any receiving PCDs 152, 154, 156 that are text enabled and have a preference of receiving text rather than audio would not need to have the text-to-speech step performed.

One can envision a scenario in which a member of the group may be in either a very noisy environment making audio difficult to hear or in a meeting where sudden audio emissions would be unwanted. In such cases, the PCDs 152, 154, 156 may be set to receive incoming messages via text.

Figure 4:
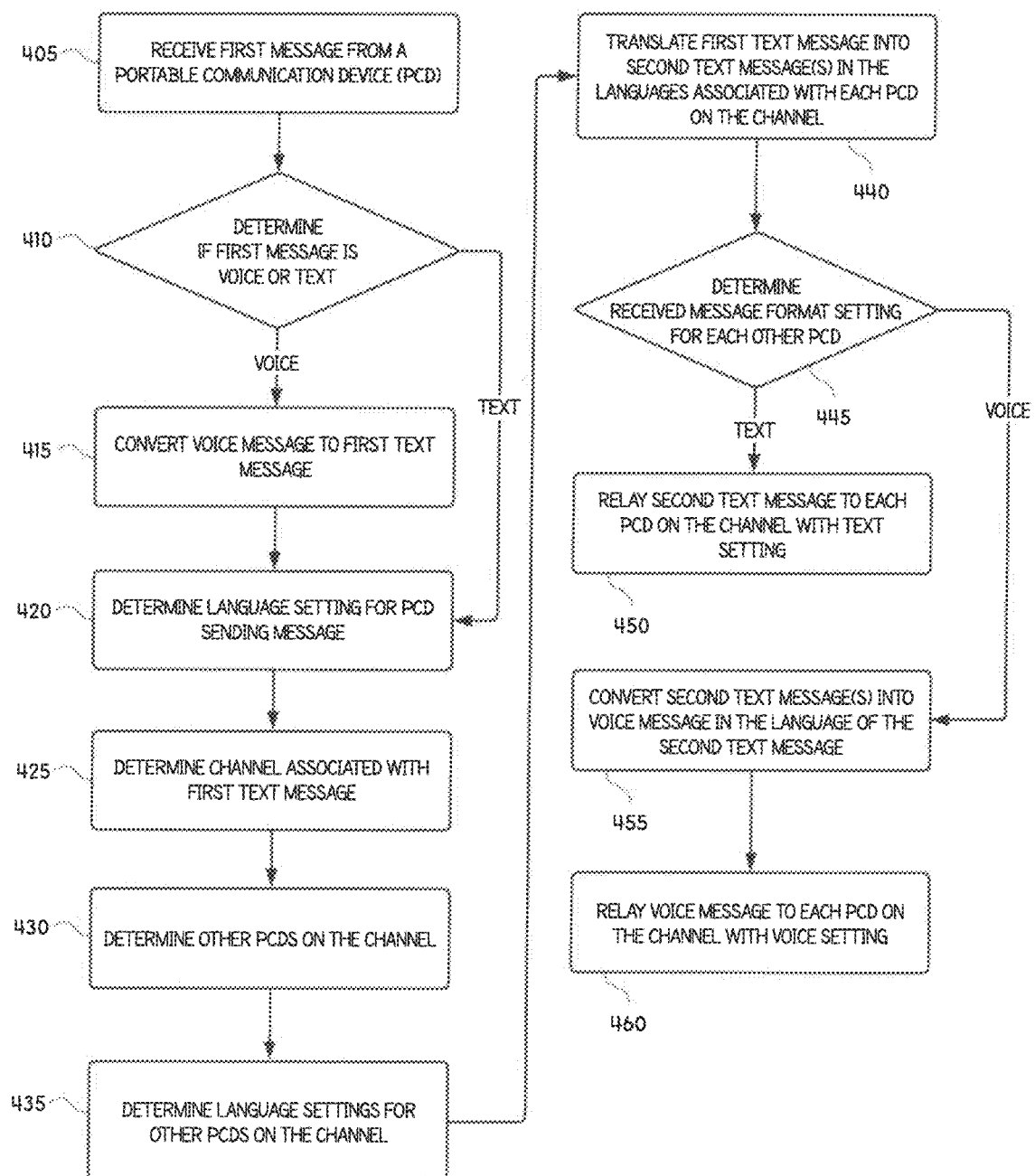
FIG. 4 is another logic flow diagram describing a language translation process carried out by a communication platform server.

FIG. 4 is another logic flow diagram describing a language translation process carried out by a communication platform server. FIG. 4 may also be described in the context of a four person user group (Bob, Maria, Pierre, and Alice) in which each user has their own user profile configured and executing on a PCD. The user profile may include language settings for outbound and inbound messages. In addition, it may be assumed that each PCD is on-line with the CPS and set to the same logical channel on which they are all members. Thus, when one member transmits a message on the channel, the other members will receive it. If the PCD for a member of the channel was not on-line or was not tuned to the proper channel, any inbound messages may not be received by that member's PCD or may be queued in a missed messages queue for later retrieval. Messages may be in audio form similar to the way one would communicate using a walkie-talkie or text form similar to SMS or other text/data based direct messaging (DM) systems.

In step 405, the CPS 110 may receive a message from a PCD 150. For instance, Bob may engage transmit mode on his PCD 150 and speak the words, "Does anyone know where Jim is?" This audio message is transmitted wirelessly from Bob's PCD 150 via a Wifi 130 or cellular 140 connection through network 120 where it is received by CPS 110. Alternatively, Bob may send the message as a text message using a text based interface.

CPS 110 may first determine whether the received message is a voice message or a text message at decision block 410. The incoming data packets associated with the received message may be characterized as either voice or text. If the received message is determined to be voice, the voice message is converted to a first text message in step 415 using speech-to-text processing. If the received message is determined to be text, no further processing on the received message need be performed.

CPS 110 then determines the language setting of the PCD 150 that sent the message in step 420. For instance, CPS 110 is aware of which PCD 150 sent the message. CPS 110 also knows which user profile 202 is currently associated with the PCD 150 that sent the message. In this example, Bob sent the message. The CPS 110 determines from Bob's user profile 202 that his language setting is set to English for both inbound and outbound communication. Alternatively, the CPS 110 may independently determine the language of the received message from Bob's PCD 150 by analyzing the audio itself if the message was in voice format or the words if the message was in text format.

In our example, CPS 110 also knows which logical channel Bob's PCD 150 is currently set to in step 425 and uses that knowledge to look up other PCDs that are included on that particular logical channel in step 430. Each logical channel may be given a label or name when it is created. This name is known to and stored by CPS 110 along with all other user profiles that are members of that channel. For illustrative purposes, the logical channel in use may be named HQ Security channel. In this case, CPS 110 determines that Maria's PCD 152, Pierre's PCD 154, and Alice's PCD 156 are all included on the HQ Security channel.

CPS 110 may then determine the language settings for each of the receiving PCDs 152, 154, 156 based on the user profile 202 for the PCDs 152, 154, 156 in step 435. CPS 110 determines that Maria's user profile 202 is set to Spanish for inbound communications, Pierre's user profile 202 is set to English for inbound communications, and Alice's user profile 202 is set to Chinese for inbound communications. CPS 110 may then translate the English text into Spanish text for Maria's PCD 152 and Chinese text for Alice's PCD 156 in step 440. No translation is needed for Pierre's PCD 154 because it is set to English which is the same language as the originally sent message.

CPS 110 may then determine the received message format setting for each PCD 152, 154, 156 in decision block 445. For instance, any given PCD may be set to receive messages in voice format or text format. This is a setting controllable by the user. For PCDs set to receive messages as text, CPS 110 will send the second text message to that PCD in the language specified by the user's user profile 202 in step 450. In this example, Maria's PCD 152 may be set to receive text messages. The CPS 110 will forward the second text message which is now in Spanish to Maria's PCD 152.

For PCDs set to receive messages as voice, CPS 110 will convert the second text message intended for that PCD in the language specified by the user profile 202 in step 455. In this example, Pierre's PCD 154 and Alices's PCD 156 may be set to receive voice messages. The CPS 110 will then forward the voice message in English to Pierre's PCD 154 and in Chinese to Alice's PCD 156 in step 460.

In this scenario, Bob sent the original message from his PCD 150 as a text message on the HQ Security channel. Maria set her PCD 152 to receive messages in text format so she receives a Spanish translation text message of Bob's text message. Pierre set his PCD 154 to receive messages in voice format so he receives a text-to-speech English version of Bob's text message. Alice set her PCD 156 to receive messages in voice format so she receives a text-to-speech Chinese version of Bob's text message.

As stated earlier, the process may be implemented without first playing the original audio in the original language. For instance, Maria and Alice may only receive the translated audio in their respective languages without hearing the original message.

The methods, devices, and systems described above are examples. Various configurations may omit, substitute, or add various procedures or components. For example, in alternative configurations, the methods may be performed in a different order. In another example, the methods may be performed with fewer steps, more steps, or in combination. In addition, certain configurations may be combined in various configurations. As technology evolves, many of the elements are examples and do not limit the scope of the disclosure or claims.

While some examples of methods, devices, and systems herein are described in terms of software executing on various machines, the methods and systems may also be implemented as specifically-configured hardware, such as a FPGA specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a RAM coupled to the processor. The processor executes computer-executable program instructions stored in memory, such as executing one or more computer programs. Such processors may comprise a microprocessor, a digital signal processor ("DSP"), an application-specific integrated circuit ("ASIC"), FPGAs, and state machines. Such processors may further comprise programmable electronic devices such as PLCs, programmable interrupt controllers ("PICs"), programmable logic devices ("PLDs"), programmable read-only memories ("PROMs"), electronically programmable read-only memories ("EPROMs" or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A method of translating messages into multiple languages among a group of wireless portable electronic communication devices (PCDs), the method comprising:
   in a communications platform server (CPS) wherein a group of PCDs operating in a half-duplex communication system are configured such that messages can be exchanged among the PCDs wherein each message received by the CPS is associated with a logical channel comprised of a unique label identifying a specific sub-group of PCDs and wherein each PCD is associated with a user profile comprising (i) the logical channels to which the user is a member, (ii) a language setting indicative of the language preference of the user, and (iii) a format setting for received messages:
   receiving a first message from a sending PCD, the first message being one of a voice message or a text message;
   determining the language setting for the sending PCD;
   when the first message is a voice message, converting the voice message to a first text message in the language in which the sending PCD is set;
   determining the logical channel associated with the first message;
   determining other PCDs associated with the logical channel;
   determining the language settings for the other PCDs associated with the logical channel;
   for each other PCD associated with the logical channel:

translating the first text message to a second text message in the language to which the other PCD is set;
determining, from the user profile, the format setting for received messages;
when the format setting for received messages is voice, converting the second text message to a second voice message in the language to which the other PCD is set and sending the second voice message to the other PCD; and
when the format setting for received messages is text, sending the second text message to the other PCD.

2. The method of claim 1, wherein the CPS maintains a record of the user profile associated with each PCD.

3. The method of claim 1, wherein the CPS maintains a record of the logical channels each PCD is associated with.

4. The method of claim 1, wherein the first message includes metadata identifying the logical channel to which the first message is associated and data comprising the first message content.

5. The method of claim 1, wherein the first message is transmitted from the sending portable communication device (PCD) over a WiFi connection to a network connected to the CPS.

6. The method of claim 1, wherein the first message is transmitted from the sending portable communication device (PCD) over a cellular connection to a network connected to the CPS.

7. A computing system for translating messages into multiple languages among a group of wireless portable electronic communication devices (PCDs) communicable with one another via a communications platform server (CPS) wherein a group of PCDs operating in a half-duplex communication system are configured such that messages can be exchanged among the PCDs wherein each message received by the CPS is associated with a logical channel comprised of a unique label identifying a specific sub-group of PCDs and wherein each PCD is associated with a user profile comprising (i) the logical channels to which the user is a member, (ii) a language setting indicative of the language preference of the user, and (iii) a format setting for received messages, the computing system comprising:
a non-transitory computer-readable medium; and
a processor in communication with the non-transitory computer-readable medium, the processor configured to execute instructions stored in the non-transitory computer-readable medium to:
receive a first message from a sending PCD, the first message being one of a voice message or a text message;
determine the language setting for the sending PCD;
when the first message is a voice message, convert the voice message to a first text message in the language in which the sending PCD is set;
determine the logical channel associated with the first message;
determine other PCDs associated with the logical channel;
determine the language settings for the other PCDs associated with the logical channel;
for each other PCD associated with the logical channel:
translate the first text message to a second text message in the language to which the other PCD is set;
determine, from the user profile, the format setting for received messages;
when the format setting for received messages is voice, convert the second text message to a second voice message in the language to which the other PCD is set and send the second voice message to the other PCD; and
when the format setting for received messages is text, send the second text message to the other PCD.

8. The computing system of claim 7, wherein the CPS maintains a record of the user profile associated with each PCD.

9. The computing system of claim 7, wherein the CPS maintains a record of the logical channels each PCD is associated with.

10. The computing system of claim 7, wherein the first message includes metadata identifying the logical channel to which the first message is associated and data comprising the first message content.

11. The computing system of claim 7, wherein the first message is transmitted from the sending portable communication device (PCD) over a WiFi connection to a network connected to the CPS.

12. The computing system of claim 7, wherein the first message is transmitted from the sending portable communication device (PCD) over a cellular connection to a network connected to the CPS.

13. A non-transitory computer-readable medium comprising program instructions executable by a processor to cause the processor to:
configure a group of portable communication devices (PCDs) in a half-duplex communication system such that messages can be exchanged among the PCDs via a communications platform server (CPS) wherein each message received by the CPS is associated with a logical channel comprised of a unique label identifying a specific sub-group of PCDs and wherein each PCD is associated with a user profile comprising (i) the logical channels to which the user is a member, (ii) a language setting indicative of the language preference of the user, and (iii) a format setting for received messages;
receive a first message from a sending PCD, the first message being one of a voice message or a text message;
determine the language setting for the sending PCD;
when the first message is a voice message, convert the voice message to a first text message in the language in which the sending PCD is set;
determine the logical channel associated with the first message;
determine other PCDs associated with the logical channel;
determine the language settings for the other PCDs associated with the logical channel;
for each other PCD associated with the logical channel:
translate the first text message to a second text message in the language to which the other PCD is set;
determine, from the user profile, the format setting for received messages;
when the format setting for received messages is voice, convert the second text message to a second voice message in the language to which the other PCD is set and send the second voice message to the other PCD; and
when the format setting for received messages is text, send the second text message to the other PCD.

14. The non-transitory computer-readable medium of claim 13, wherein the CPS maintains a record of the user profile associated with each PCD.

15. The non-transitory computer-readable medium of claim 13, wherein the CPS maintains a record of the logical channels each PCD is associated with.

16. The non-transitory computer-readable medium of claim 13, wherein the first message includes metadata identifying the logical channel to which the first message is associated and data comprising the first message content.

17. The non-transitory computer-readable medium of claim 13, wherein the first message is transmitted from the sending portable communication device (PCD) over a WiFi connection to a network connected to the CPS.

18. The non-transitory computer-readable medium of claim 13, wherein the first message is transmitted from the sending portable communication device (PCD) over a cellular connection to a network connected to the CPS.

* * * * *